United States Patent
Lai et al.

(10) Patent No.: US 7,936,844 B2
(45) Date of Patent: May 3, 2011

(54) CHANNEL ESTIMATION APPARATUS WITH THE OPTIMAL SEARCH AND METHOD THEREOF

(75) Inventors: Kuo-Li Lai, Taichung (TW); Ching-Piao Hung, Jhudong Township, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 805 days.

(21) Appl. No.: 11/854,549

(22) Filed: Sep. 13, 2007

(65) Prior Publication Data
US 2008/0063098 A1 Mar. 13, 2008

(30) Foreign Application Priority Data
Sep. 13, 2006 (TW) ................................ 95133857 A

(51) Int. Cl.
*H04L 27/14* (2006.01)
*H04L 27/06* (2006.01)
(52) U.S. Cl. ...................................... 375/316; 375/340
(58) Field of Classification Search .................. 375/260, 375/262, 340–341, 347, 316, 324–325, 343; 370/208, 210, 281, 296, 301, 330, 343, 436, 370/478, 480, 481, 302; 329/315–316, 325, 329/319
See application file for complete search history.

(56) References Cited

U.S. PATENT DOCUMENTS

| 6,771,591 | B1* | 8/2004 | Belotserkovsky et al. | 370/210 |
| 7,058,148 | B1* | 6/2006 | Huttunen | 375/354 |
| 2002/0010896 | A1* | 1/2002 | Huttunen | 714/796 |
| 2003/0138060 | A1 | 7/2003 | Alcouffe | |
| 2006/0159203 | A1* | 7/2006 | Poloni et al. | 375/340 |
| 2009/0232258 | A1* | 9/2009 | Naito et al. | 375/343 |
| 2009/0252026 | A1* | 10/2009 | Yousef | 370/210 |

FOREIGN PATENT DOCUMENTS
EP 1580951 A2 9/2005

* cited by examiner

*Primary Examiner* — Tesfaldet Bocure
*Assistant Examiner* — Lawrence B Williams
(74) *Attorney, Agent, or Firm* — Jianq Chyun IP Office

(57) ABSTRACT

A channel estimation apparatus and the method thereof are disclosed. The channel estimation apparatus includes a time-domain-axis channel estimation unit, a peak-detection module, a first-shift unit, a frequency-domain-axis channel estimation unit and an optimal shift searching module. The time-domain-axis channel estimation unit is used for performing the channel estimation in the time domain so as to obtain initial channel frequency responses by estimating. The peak-detection module is used for outputting a peak information. The shift-optimal-searching module decides the optimal shift information according to the peak information, a feedback signal and entire channel frequency responses. The first-shift unit is used for adjusting the positions of the initial channel frequency responses in the time domain according to the optimal shift information. The frequency-domain-axis channel estimation unit is used for performing the channel estimation in the frequency domain so as to obtain the entire channel frequency responses by estimating.

15 Claims, 4 Drawing Sheets

CHANNEL ESTIMATION APPARATUS WITH THE OPTIMAL SEARCH AND METHOD THEREOF

CROSS-REFERENCE TO RELATED APPLICATION

This application claims the priority benefit of Taiwan application serial no. 95133857, filed Sep. 13, 2006. All disclosure of the Taiwan application is incorporated herein by reference.

BACKGROUND OF THE INVENTION

1. Field of the Invention

The present invention generally relates to a channel estimation apparatus, and more particular, to a channel estimation apparatus with the optimal search applicable to a coherent orthogonal frequency division multiplex system (coherent (OFDM system).

2. Description of Related Art

In recent years, because of the advantages an OFDM system has, such as the high-speed transmission, the high usage efficiency of bandwidth and the good robustness from channel delay and inter-symbol interference, the OFDM system has been broadly applied in digital video broadcasting-terrestrial system (DVB-T system), wireless local area network communication (WLAN communication) and digital audio broadcasting system (DAB system). According to the adopted modulation approach, an OFDM system is categorized into a coherent OFDM system and a non-coherent OFDM system. In terms of the coherent OFDM system, to have a reliable coherent detection capability and to compensate the damage caused by a channel variation, the receiver of the coherent OFDM system must have an accurate channel estimation capability so as to correctly judge the symbols in the received signal.

A coherent OFDM system usually adopts so-called pilot data to assist in conducting a channel estimation. For example, the US Published Patent Application No. 20030138060 discloses a COFDM demodulator with an optimal FFT analysis window positioning. However, the disclosed demodulator does not take account of the effect of the subcarrier channel frequency responses (subcarrier CFRs) on deciding the shift information during a channel estimation process carried by the demodulator. Therefore, the shift information which the demodulator utilises is not the optimal one according to the maximum likelihood estimation (MLE). Moreover, the disclosed demodulator requires huge amounts of the computations for generating the better shift information. In other words, the disclosed demodulator not only is unable to realize the optimal channel estimation, but also fails to effectively advance the operation speed of the system.

In addition, the European Published Patent Application No. EP1580951 discloses a scheme where the delay spread in a channel impulse response is used to assist in estimating the shift information required by a frequency interpolation filter, but the patent application does not explain in detail how to obtain the delay spread in a channel impulse response.

SUMMARY OF THE INVENTION

An objective of the present invention is to provide a channel estimation apparatus with the optimal search, which utilizes the peak information to advance the operation speed thereof and takes the subcarrier CFRs into consideration, so that the channel estimation apparatus acquires the optimal shift information for effectively promoting the accuracy of the channel estimation apparatus.

Another objective of the present invention is to provide a channel estimation method with the optimal search capable of effectively promoting the accuracy and the operation speed of the channel estimation apparatus.

To achieve the above-mentioned or other objectives, the present invention provides a channel estimation apparatus with the optimal search suitable for a demodulator, wherein the demodulator outputs a frequency domain received signal and a feedback signal. The channel estimation apparatus is adopted for estimating an entire channel frequency response (entire CFR) and an optimal shift information from the frequency domain received signal according to the feedback signal. The channel estimation apparatus includes a time domain axis channel estimation unit (TAC estimation unit), a peak detection module, a first shift unit, a frequency domain axis channel estimation unit (FAC estimation unit) and an optimal shift searching module with the optimal search. The TAC estimation unit is used for receiving a frequency domain received signal and performing the channel estimation in the time domain dimension according to the scattered pilot data in the frequency domain received signal so as to estimate an initial channel frequency response (initial CFR). The peak detection module is used for detecting a peak position of the initial CFR in the time domain and the detected peak position is served as the peak information for output. The first shift unit is used for adjusting the relative positions of the initial CFR in the time domain according to the optimal shift information and generating the adjusted initial CFR. The FAC estimation unit is used for performing the channel estimation in the frequency domain dimension according to the numerical values of the adjusted initial CFR so as to obtain the entire CFR. The optimal shift searching module is used for generating a plurality of shift information according to the peak information and deciding the optimal shift information from the plurality of shift information by using the feedback signal and the entire CFR.

In the embodiment of the present invention, when the feedback signal is the output signal of the shift unit, the above-mentioned optimal shift searching module includes a transmission parameter unit (TP unit), an extract unit, a calculation unit and a decision unit. The TP unit is used for providing a plurality of mapping transmission parameters (mapping TPs), wherein the mapping TPs are respectively corresponding to the plurality of TPs in the frequency domain received signal. The extract unit is used for extracting a plurality of TPs from the shift unit and extracting a plurality of subcarrier CFRs with the TPs from the entire CFR. The calculation unit is used for performing operations on the mapping TPs, the TPs extracted by the extract unit and the subcarrier CFRs according to the maximum likelihood estimation (MLE) so as to output the decision information. The decision unit is used for generating a plurality of shift information according to the peak information and selecting one of the plurality of shift information as the optimal shift information according to the decision information.

In the embodiment of the present invention, when the feedback signal is the output signal of the correction unit, the above-mentioned optimal shift searching module includes a TP unit, an extract unit, a calculation unit and a decision unit. The TP unit is used for providing a plurality of mapping TPs, wherein the mapping TPs are respectively corresponding to the plurality of TPs in the frequency domain received signal. The extract unit is used for extracting a plurality of TPs from the correction unit and extracting a plurality of subcarrier CFRs with the TPs from the entire CFR. The calculation unit is used for performing operations on the mapping TPs, the TPs extracted by the extract unit and the subcarrier CFRs according to the MLE so as to output the decision information. The decision unit is used for generating a plurality of shift information according to the peak information and selecting one of the plurality of shift information as the optimal shift information according to the decision information.

In the embodiment of the present invention, when the feedback signal is the frequency domain received signal, the above-mentioned optimal shift searching module includes a TP unit, an extract and shift unit, a calculation unit and a decision unit. The TP unit is used for providing a plurality of mapping TPs, wherein the mapping TPs are respectively corresponding to the plurality of TPs of the frequency domain received signal. The extract and shift unit is used for extracting and adjusting a plurality of TPs in the frequency domain received signal and extracting a plurality of subcarrier CFRs with the TPs from the entire CFR. The calculation unit is used for performing operations on the mapping TPs, the TPs extracted and adjusted by the extract and shift unit and the subcarrier CFRs according to the MLE so as to output the decision information. The decision unit is used for generating a plurality of shift information according to the peak information and selecting one of the plurality of shift information as the optimal shift information according to the decision information and the extract and shift unit adjusts the TPs in the frequency domain received signal according to the plurality of shift information.

On the other hand, the present invention further provides a channel estimation method with the optimal search suitable for a demodulator application, wherein the demodulator outputs a frequency domain received signal and a feedback signal. The channel estimation method is used for estimating the entire CFR and the optimal shift information from the frequency domain received signal according to the feedback signal. The channel estimation method includes receiving the frequency domain received signal, which includes a plurality of symbols and every symbol includes a scattered pilot data and a TP and performing the channel estimation in the time domain according to the channel information generated by the scattered pilot data so as to obtain an estimation of the initial CFR. In order to adjust the position of the initial CFR into the optimal position in the time domain axis, first, the peak position of the initial CFR in the time domain is detected, and a peak information is generated; and then, the optimal shift information can be decided according to the peak information and the feedback signal; and further, the relative position of the initial CFR in time domain can be adjusted according to the optimal shift information. Furthermore, the channel estimation method includes performing the channel estimation in the frequency domain according to the numerical values of the initial CFR so as to get the estimation of the entire CFR.

In the embodiment of the present invention, the above-mentioned step for deciding the optimal shift information according to the peak information and the feedback signal includes, first, generating a plurality of shift information according to the peak information; next, adjusting the relative position of the initial CFR in time domain one by one according to each of the shift information; after that, performing the channel estimation in the frequency domain according to the numerical values of the adjusted initial CFRs so as to obtain the estimations of the entire CFRs; then, performing calculations on the feedback signal and the information regarding the TPs in the above-mentioned entire CFR so as to obtain a plurality of calculation results; and selecting one of the shift information according to the plurality of calculation results as the optimal shift information.

Since the present invention uses the peak information to promote the operation speed of the channel estimation apparatus and takes the influence of subcarrier CFRs on the shift information into consideration, therefore, the provided channel estimation apparatus is able to acquire the optimal shift information, which leads the accuracy of the channel estimation apparatus can be promoted.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The primary technique features of the present invention reside in that the peak information is used to reduce the computation number required for the optimal shift searching module to accomplish the optimal search and the subcarrier CFRs are taken into consideration during the process of deciding the shift information conducted by the optimal shift searching module, so that the channel estimation apparatus of the present invention has good accuracy and fast operation speed. In the following, some embodiments of the channel estimation apparatus are explained, but these embodiments do not limit the present invention. In fact, anyone skilled in the art is able to reasonably modify the embodiments according to the spirit of the invention, which still falls within the scope of the present invention.

Figure 1:
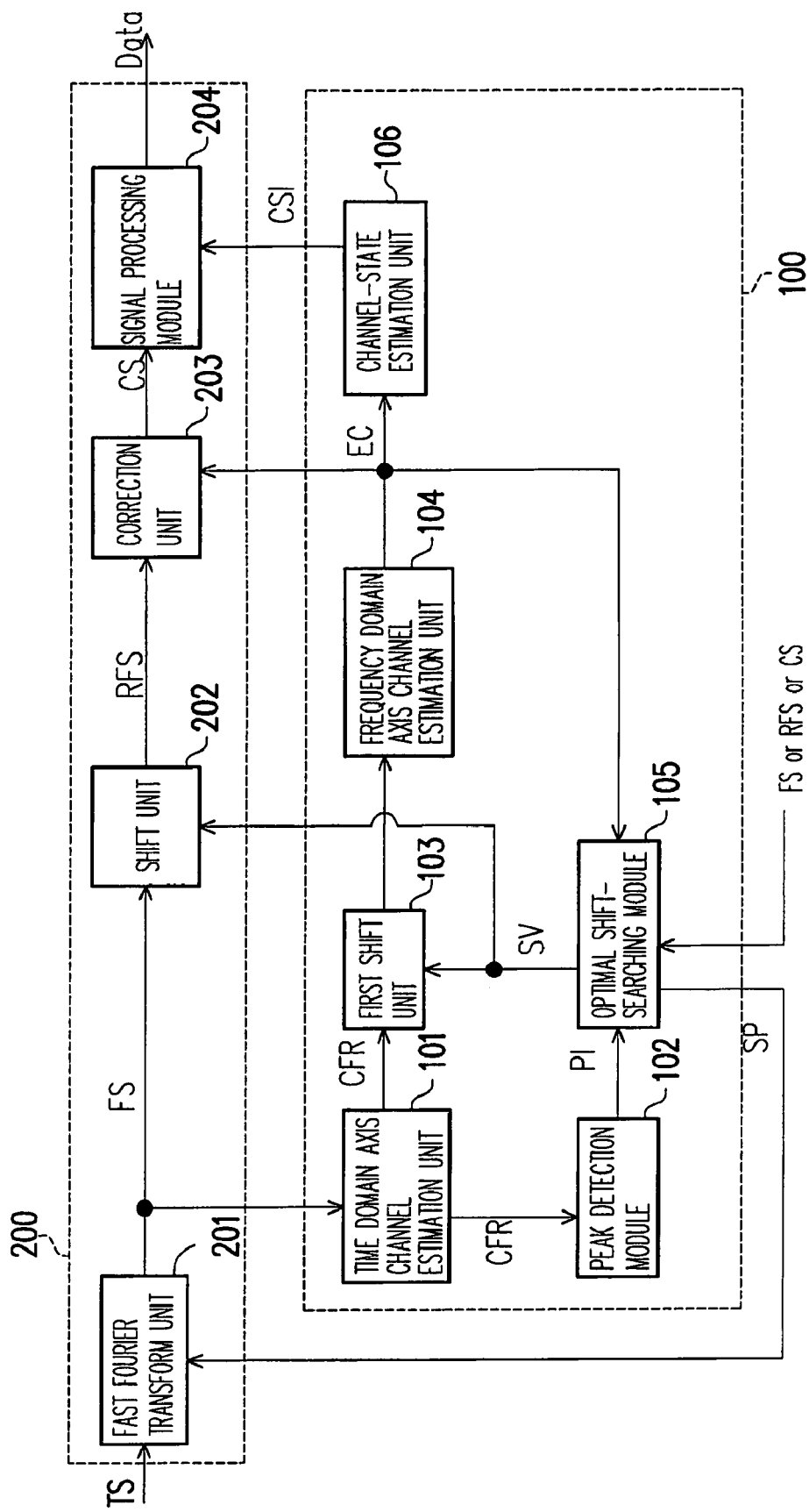
FIG. 1 is an architecture diagram of the channel estimation apparatus with the optimal search according to an embodiment of the present invention.

FIG. 1 is an architecture diagram of the channel estimation apparatus with the optimal search according to an embodiment of the present invention. The channel estimation apparatus 100 of the embodiment includes a time domain axis channel estimation unit (TAC estimation unit) 101, a peak detection module 102, a first shift unit 103, a frequency domain axis channel estimation unit (FAC estimation unit) 104 and an optimal shift searching module 105. For convenience, FIG. 1 also illustrates the demodulator 200 which is suitable for the channel estimation apparatus 100, wherein the demodulator 200 includes a fast Fourier transform unit (FFT unit) 201, a shift unit 202, a correction unit 203 and a signal processing module 204.

In more detail, the above-mentioned FFT unit 201 is used for performing FFT computations, judging the initial point for computing the transmitted signal (to be received) TS by using the position information SP and generating a frequency domain received signal FS after the computation. The shift unit 202 is used for adjusting the relative position of the frequency domain received signal FS in time domain according to the optimal shift information SV. The correction unit 203 is used for correcting the output signal RFS of the shift unit 202 according to the entire channel frequency response (entire CFR) EC. The signal processing module 204 is used for conducting the operations related to demodulating and decoding so as to output the data. Data carried by the output signal TS.

Referring to FIG. 1, the channel estimation apparatus 100 of the embodiment is used for estimating the entire CFR EC and the optimal shift information SV from the frequency domain received signal FS according to the feedback signal FBS, wherein the feedback signal FBS is one selected from a group comprising of the frequency domain received signal FS, the output signal RFS of the shift unit 202 and the output signal CS of the correction unit 203.

Figure 2:
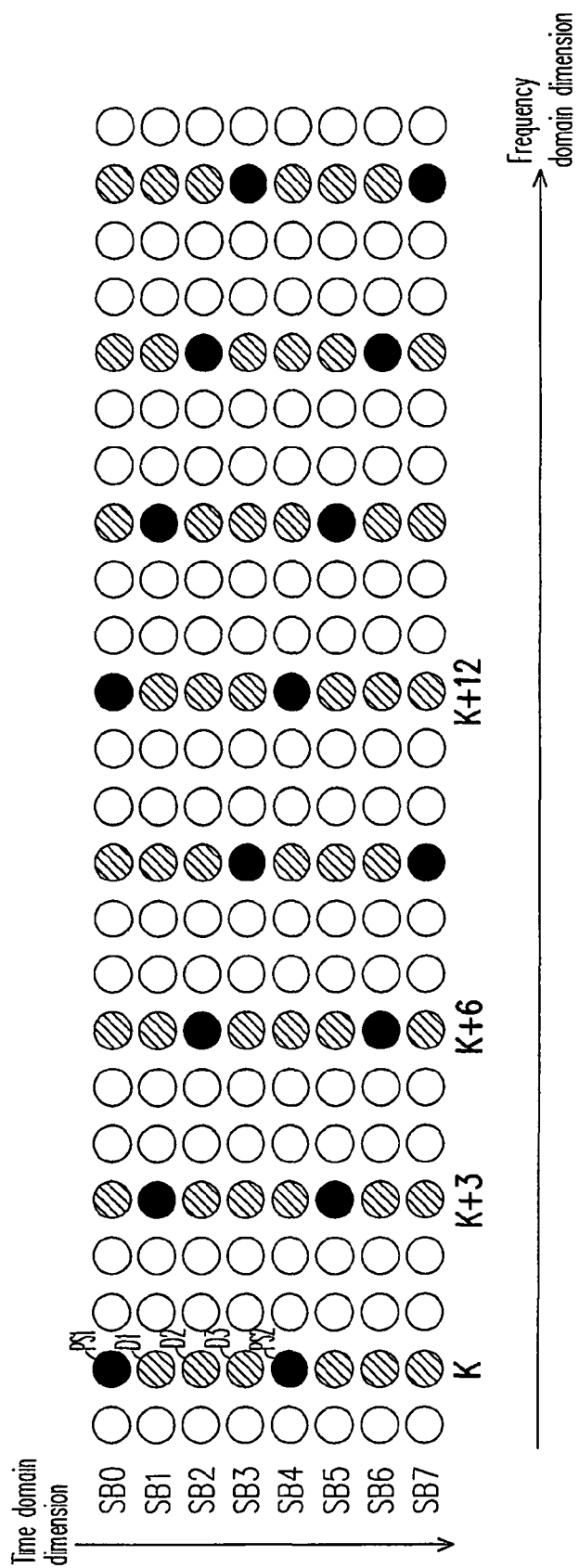
FIG. 2 is a signal diagram of FIG. 1.

FIG. 2 is a signal diagram of FIG. 1. Referring to FIG. 2, the above-mentioned frequency domain received signal FS includes a plurality of symbols (in FIG. 2, only symbols SB0-SB7 are illustrated). The symbols SB0-SB7 include data, scattered pilot data and a transmission parameter signaling signal (TPS signal). In FIG. 2, white circle marks represent the data, the black circle marks represent the scattered pilot data, circle marks with oblique hatching lines represent the data used for the channel estimation, and the TPs are carried by a plurality of parallel carriers (not shown in FIG. 2). In addition, the carrier responsible for with the symbols SB0-SB7 includes a plurality of subcarriers (in FIG. 2, only several subcarriers are illustrated), for example, the K-th subcarrier respectively carries the data or scattered pilot data of the symbols SB0-SB7 at different time points, wherein K is an integer greater than zero.

A channel estimation is mainly intended for estimating the frequency response of the subcarrier channel, to which each subcarrier belongs, so as to compensate the damage of the frequency domain received signal FS caused by a channel variation. Referring to FIG. 1 again, the channel estimation apparatus 100 of the embodiment adopts a 2-D interpolation to implement the channel estimation, wherein the 2-D interpolation is equivalent to 1-D interpolations in two phases for the implementation. Hence, the channel estimation apparatus 100 would first estimate the subcarrier CFRs of the partial subcarriers by using the TAC estimation unit 101, followed by estimating the subcarrier CFRs of all the subcarriers through the FAC estimation unit 104. The detail operation principle of the channel estimation apparatus 100 is described hereinafter.

First, the TAC estimation unit 101 performs the channel estimation in the time domain according to the frequency domain received signal FS according to the channel information formed by the scattered pilot data so as to get the estimation of the initial CFR IC. For example, the TAC estimation unit 101 performs the channel estimation in the data D1-D3 in 1-D interpolation by using the scattered pilot data PS1 and PS2 carried by the K-th subcarrier, wherein the data D1-D3 are represented by circle marks with oblique hatching lines. In this way, the CFRs of the subcarriers, which (for example, the K-th subcarrier, the (K+3)-th subcarrier, the (K+6)-th subcarrier) with the correlated scattered pilot data therebetween, can be estimated. However, the above-mentioned initial CFRs only include a part of the CFRs; since there are other subcarriers with the scattered pilot data uncorrelated to the above-mentioned scattered pilot data (for example, the (K+1)-th subcarrier, the (K+2)-th subcarrier, the (K+4)-th subcarrier and the (K+5)-th subcarrier), for which the subcarrier CFRs are not yet estimated at the point.

Prior to conducting the channel estimation of the FAC estimation unit 104, first, the first shift unit 103 would adjust the relative position of the initial CFRs in the time domain according to the optimal shift information SV and generate the adjusted initiative CFRs. Next, FAC estimation unit 104 performs the channel estimation in the frequency domain according to the numerical values of the adjusted initiative CFRs so as to obtain the entire CFR EC. For example, by means of the numerical values of the CFRs of the K-th subcarrier and the (K+3)-th subcarrier, the channel estimation can be performed on the data carried by the (K+1)-th subcarrier and the (K+2)-th subcarrier at different time points in 1-D interpolation, followed by estimating the CFRs of the (K+1)-th subcarrier and the (K+2)-th subcarrier. In other words, an entire CFR EC includes the CFRs of all the subcarriers. According to the entire CFR EC, the correction unit 203 is able to compensate the damage of the frequency domain received signal FS caused by a channel variation.

The above-mentioned optimal shift information SV is generated as follows. First, the peak detection module 102 detects the peak positions of the initial CFRs IC in the time domain and outputs the peak information PI. Next, the optimal shift searching module 105 generates a plurality of the shift information according to the peak information PI and decides the optimal shift information SV from the plurality of the shift information by using the feedback signal FBS and the entire CFR EC.

In addition, the channel estimation apparatus 100 further includes a channel-state estimating calculation unit 106 for estimating the channel-state information CSI according to the entire CFR EC. The signal processing module 204 can thereby perform the operations related to demodulating and decoding the output signal CS of the correction unit.

According to different feedback signals FBS, the optimal shift searching module 105 of FIG. 1 can be implemented in different architectures, as described hereinafter.

Figure 3:
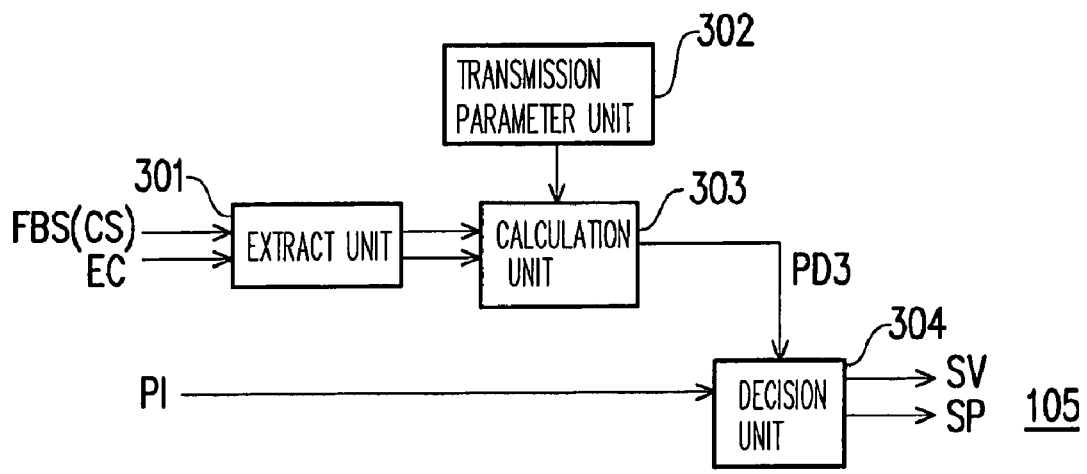
FIG. 3 is an architecture diagram of the optimal shift searching module according to the embodiment of the present invention.

FIG. 3 is an architecture diagram of the optimal shift searching module 105 according to the embodiment of the present invention. As shown in FIG. 3, the optimal shift searching module 105 includes an extract unit 301, a transmission parameter unit (TP unit) 302, a calculation unit 303 and a decision unit 304. Herein the feedback signal FBS is the output signal CS of the correction unit 203. The TP unit 302 is used for providing a plurality of mapping transmission parameters (mapping TPs), wherein the mapping TPs are respectively corresponding to the plurality of TPs of the frequency domain received signal FS. The extract unit 301 is used for extracting a plurality of TPs in the output signal CS of the correction unit 203 and extracting a plurality of subcarrier CFRs with the TPs from the entire CFR. The calculation unit 303 then performs computations as shown by the following formulas (1) and (2) on the mapping TPs, the TPs extracted by the extract unit 301 and the subcarrier CFRs with the TPs according to the maximum likelihood estimation (MLE) so as to obtain a calculation result ML3:

$$L3_- = \sum_{M=1} |\hat{H}_M|^2 \cdot |\hat{S}_M + S_M|^2; \quad L3_+ = \sum_{M=1} |\hat{H}_M|^2 \cdot |\hat{S}_M - S_M|^2 \quad (1)$$

$$ML3 = \text{Min}(L3_-, L3_+) \quad (2)$$

$$ML3 = \text{Min}(L3_-, L3_+) \qquad (2)$$

where $S_M$ is the M-th mapping TP, $\hat{S}_M$ is the M-th TP extracted by the extract unit 301, $\hat{H}_M$ is the subcarrier CFR with the M-th TP, i is the number of the TPs. For example, for a carrier in "2K" mode (where each symbol is carried by 2048 subcarriers), the fixed 17 pieces of subcarriers respectively with a TP and 17 TPs in total, thus, i=17; for a carrier in "8K" mode (where each symbol is carried by 8192 subcarriers), the fixed 68 of subcarriers respectively with a TP and 68 TPs in total, thus, i=68.

On the other hand, the decision unit 304 generates a plurality of shift information according to the peak information PI. Each of the shift information is delivered to the shift unit 202 and the first shift unit 103. Namely, each of the shift information is able to indirectly generate an output signal CS and an entire CFR EC, and both of CS and EC are fed back to the extract unit 301. Accordingly, the calculation unit 303 would generate a plurality of calculation results ML3 according to the different output signals of the extract unit 301 and obtain a decision information PD3 from the calculation results ML3 for output. After that, the decision unit 304 selects one of the above-mentioned shift information for output by using the decision information PD3, wherein the output shift information is counted as the optimal shift information SV.

In addition, the decision unit 304 also generates a piece of position information SP as deciding the optimal shift information SV. The FFT unit 201 thereby decides the initial point for computing the transmitted signal TS according to the position information SP.

Figure 4:
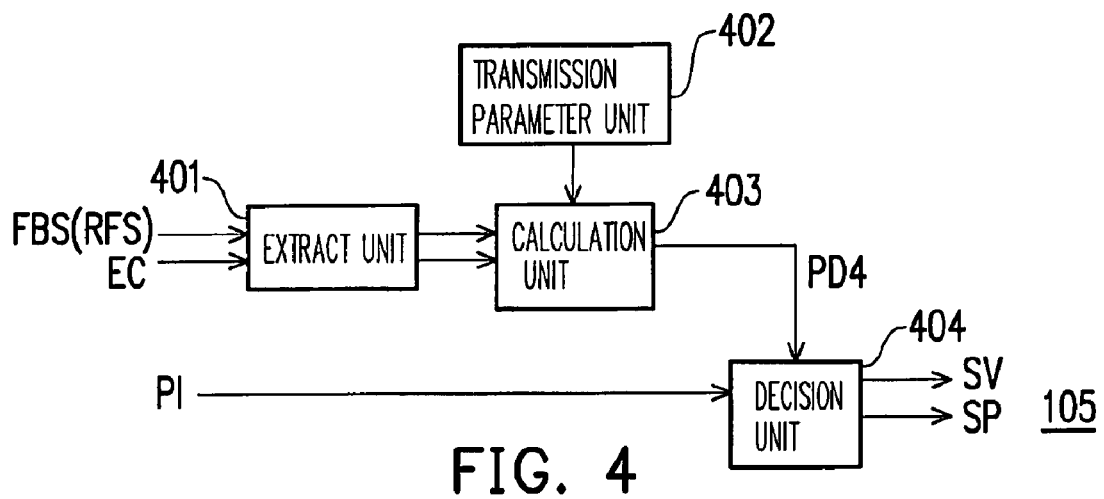
FIG. 4 is another architecture diagram of the optimal shift searching module according to the embodiment of the present invention.

FIG. 4 is another architecture diagram of the shift optimal searching module 105 according to the embodiment of the present invention. As shown in FIG. 4, the optimal shift searching module 105 includes an extract unit 401, a transmission parameter unit (TP unit) 402, a calculation unit 403 and a decision unit 404. Herein the feedback signal FBS is the output signal RFS of the shift unit 202. The TP unit 402 is used for providing a plurality of mapping transmission parameters (mapping TPs), wherein the mapping TPs are respectively corresponding to the TPs of the frequency domain received signal FS. The extract unit 401 is used for extracting the TPs in the output signal RFS of the shift unit 202 and extracting the subcarrier CFRs with the TPs from the entire CFR. The calculation unit 403 then performs computations as shown by the following formulas (3) and (4) on the mapping TPs, the TPs extracted by the extract unit 401 and the numerical values of the subcarrier CFRs with the TPs according to the maximum likelihood estimation (MLE) so as to obtain a calculation result ML4:

$$L4_- = \sum_{k=1} |R_M + S_M \hat{H}_M|^2; L4_+ = \sum_{k=1} |R_M - S_M \hat{H}_M|^2 \qquad (3)$$

$$ML4 = \text{Min}(L4_-, L4_+) \qquad (4)$$

$$ML4 = \text{Min}(L4_-, L4_+) \qquad (4)$$

where $S_M$ is the M-th mapping TP, $R_M$ is the M-th TP extracted by the extract unit 401, $\hat{H}_M$ is the subcarrier CFR with the M-th TP, i is the number of the TPs. For example, for a carrier in "2K" mode (where each symbol is carried by 2048 subcarriers), the fixed 17 pieces of subcarriers respectively with a TP and 17 TPs in total, thus, i=17; for a carrier in "8K" mode (where each symbol is carried by 8192 subcarriers), the fixed 68 pieces of subcarriers respectively with a TP and 68 TPs in total, thus, i=68.

On the other hand, the decision unit 404 generates a plurality of shift information according to the peak information PI. Each of the shift information is delivered to the shift unit 202 and the first shift unit 103. Namely, each of the shift information is able to indirectly generate an output signal RFS and an entire CFR EC, and both of RFS and EC are fed back to the extract unit 401. Accordingly, the calculation unit 403 would generate a plurality of calculation results ML4 according to the different output signals of the extract unit 401 and obtain a decision information PD4 from the calculation results ML4 for output. After that, the decision unit 404 selects one of the above-mentioned shift information for output by using the decision information PD4, wherein the output shift information is counted as the optimal shift information SV.

In addition, the decision unit 404 also generates a piece of position information SP as deciding the optimal shift information SV. The FFT unit 201 thereby decides the initial point for computing the transmitted signal TS according to the position information SP.

Figure 5:
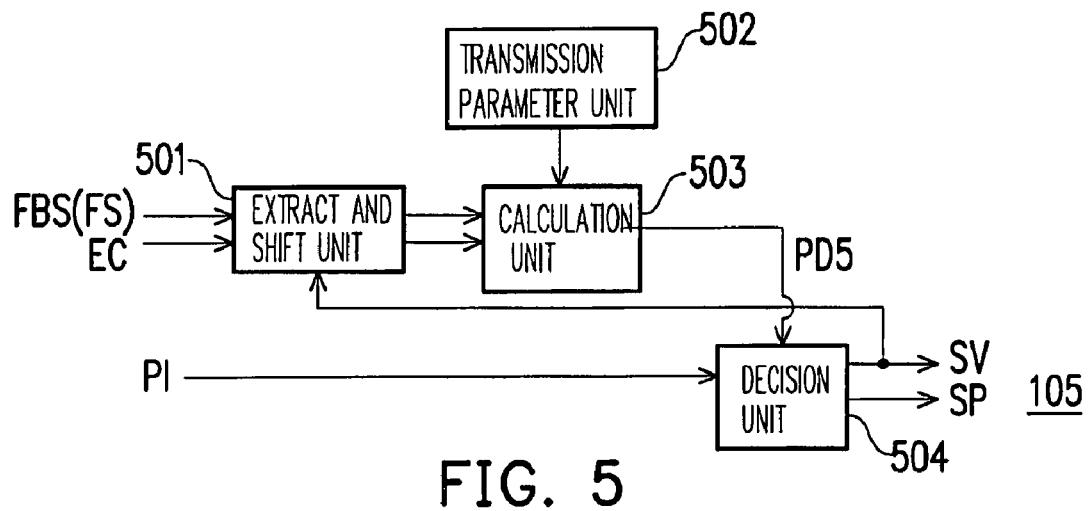
FIG. 5 is another yet architecture diagram of the optimal shift searching module according to the embodiment of the present invention.

FIG. 5 is yet another architecture diagram of the optimal shift searching module 105 according to the embodiment of the present invention. As shown by FIG. 5, the optimal shift searching module 105 includes an extract and shift unit 501, a transmission parameter unit (TP unit) 502, a calculation unit 503 and a decision unit 504. Herein the feedback signal FBS is the frequency domain received signal FS. The TP unit 502 is used for providing a plurality of mapping transmission parameters (mapping TPs), wherein the mapping TPs are respectively corresponding to the TPs of the frequency domain received signal FS. The extract and shift unit 501 is used for extracting and adjusting the TPs in the frequency domain received signal FS und extracting the subcarrier CFRs with the TPs from the entire CFR. The calculation unit 503 then performs computations as shown by the following formulas (5) and (6) on the mapping TPs, the TPs extracted and adjusted by the extract and shift unit 501 and the subcarrier CFRs with the TPs according to the maximum likelihood estimation (MLE) so as to obtain a calculation result ML5:

$$L5_- = \sum_{k=1} |R1_M + S_M \hat{H}_M|^2; L5_+ = \sum_{k=1} |R1_M - S_M \hat{H}_M|^2 \qquad (5)$$

$$ML5 = \text{Min}(L5_-, L5_+) \qquad (6)$$

$$ML5 = \text{Min}(L5_-, L5_+) \qquad (6)$$

where $S_M$ is the M-th mapping TP, $RI_M$ is the M-th shifted TP extracted by the extract and shift unit 501, $\hat{H}_M$ is the subcarrier CFR with the M-the TP, i is the number of the TPs. The number of the TPs can refer to the examples cited by the embodiments of FIGS. 3 and 4, and it is omitted to describe for simplicity.

On the other hand, the decision unit 504 generates a plurality of shift information according to the peak information PI. Each of the shift information is delivered to the first shift unit 103, the shift unit 202 and the extract and shift unit 501, wherein the extract and shift unit 501 would adjust the TPs in the frequency domain received signal FS according to the shift information. Namely, each of the shift information is able to indirectly generate an entire CFR EC fed back to the extract and shift unit 501. Accordingly, the calculation unit 503 generates a plurality of calculation results ML5 according to the different output signals of the extract and shift unit 501 and obtain a decision information PD5 from the calculation results ML5 for output. After that, the decision unit 504 selects one of the above-mentioned shift information for output by using the decision information PD5, wherein the output shift information is counted as the optimal shift information SV.

In addition, the decision unit 504 also generates a piece of position information SP in addition to deciding the optimal shift information SV. The FFT unit 201 thereby decides the initial point for computing the transmitted signal TS according to the position information SP.

It is remarkable from the embodiments illustrated by FIGS. 3-5 that prior to acquiring the optimal result (namely, prior to obtaining the optimal shift information), the channel estimation apparatus of the present invention determines the returning number for the feedback signal FBS to be fed back to the optimal shift searching module according to the piece number of the shift information (for example, 5 pieces). The calculation number required for the optimal shift searching module to obtain the optimal result is determined by the piece number of the shift information. However, in the prior art, in order to lower the fault rate of the channel estimation, the calculation number required for generating the optimal shift information is determined by the number of the subcarriers (for example, there are 2048 subcarriers for "2K" mode, while 8192 subcarriers for "8K" mode). Compared to the prior art, it is obvious the present embodiments of the present invention significantly promotes the operation speed of the channel estimation apparatus.

Figure 6:
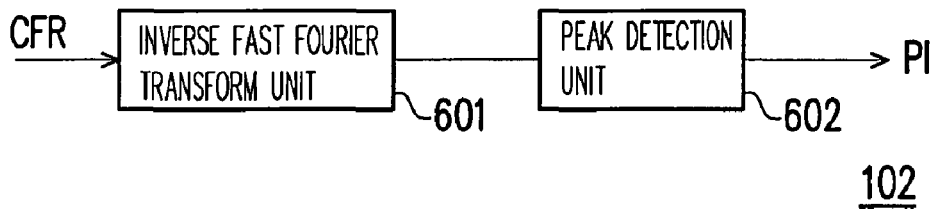
FIG. 6 is an architecture diagram of the peak detection module according to the embodiment of the present invention.

FIG. 6 is an architecture diagram of the peak detection module 102 according to the embodiment of the present invention. As shown in FIG. 6, the peak detection module 102 includes an inverse fast Fourier transform unit (IFFT unit) 601 and a peak detection unit 602. The IFFT unit 601 is used for converting the initial CFR IC from the frequency domain expression thereof into the time domain expression, while the peak detection unit 602 is used for detecting the peak position from the IFFT unit as the peak information PI for output.

Figure 7:
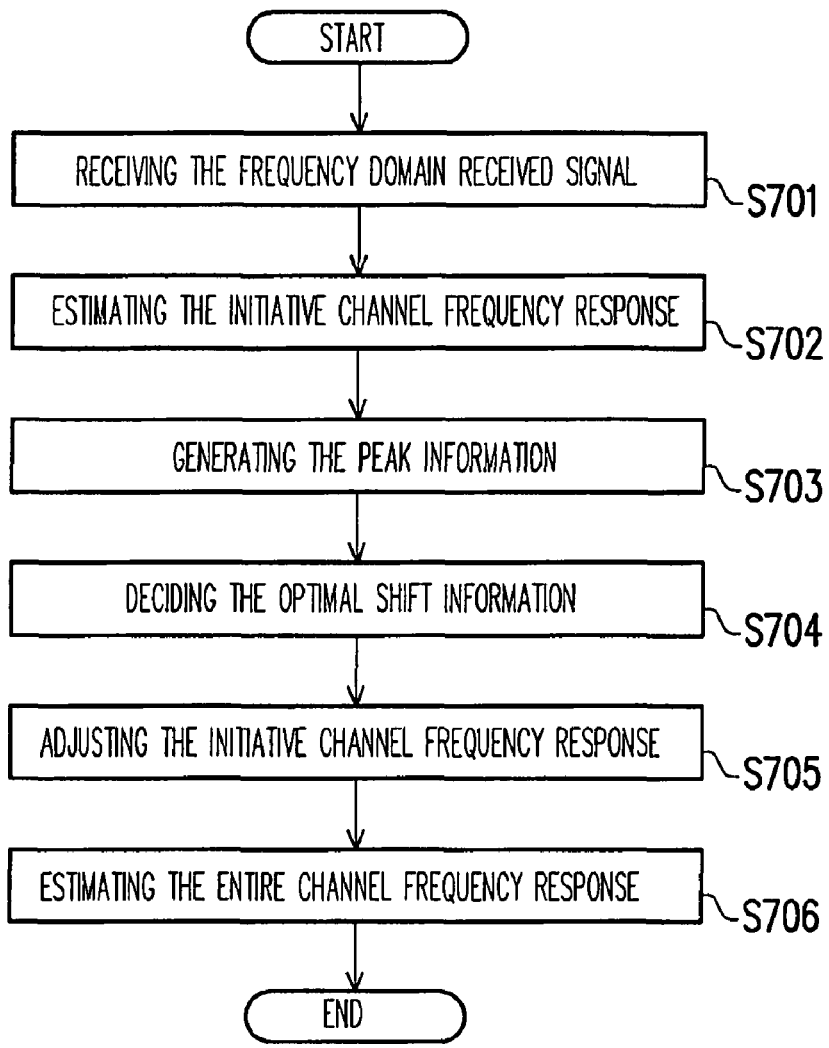
FIG. 7 is a flowchart of the channel estimation method according to an embodiment of the present invention.

I addition to the channel estimation apparatus used in a demodulator, the present invention further provides the channel estimation method used in a demodulator. FIG. 7 is a flowchart of the channel estimation method according to an embodiment of the present invention, wherein the process flow of the method is similar to the operation flow of the channel estimation apparatus in the above-described embodiments.

First in step S701, a frequency domain received signal is input, wherein the frequency domain received signal includes a plurality of symbols and each of the symbols includes a piece of scattered pilot data and a transmission parameter (TP). Next in step S702, the channel estimation in the time domain is performed based on the channel information generated by the above-mentioned scattered pilot data so as to get an estimation of the initial CFR. Then in step S703, the peak position of the initial CFR in time domain is detected for generating the peak information. Further in step S704, in order to adjust the initial CFR into at the optimal position, the optimal shift information is decided according to the peak information and the feedback signal. Furthermore in step S705, the relative position of the initial CFR in time domain is adjusted according to the optimal shift information. Finally in step S706, the channel estimation in the frequency domain is performed on the adjusted numerical values of the initial CFR so as to estimate the entire channel frequency response (entire CFR). The other details of the method has been included in the above-described embodiments, thus, they are omitted to describe for simplicity.

It should be noted that the channel estimation apparatus and the channel estimation method in the above-described embodiments are applicable to a coherent OFDM system.

In summary, the present invention uses the peak information to reduce the computation number required for the optimal shift searching module to acquire the optimal result. In the algorithm for generating the decision information, the subcarrier channel responses are taken into account. Therefore, the present invention is overwhelming not only in the fast operation speed, but also in good accuracy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A channel estimation apparatus with an optimal search, suitable for a demodulator, said demodulator comprises a fast fourier transform unit (FFT unit), a shift unit, a correction unit and a signal processing module, wherein the FFT unit generates a frequency domain received signal, the demodulator selects one of the frequency domain received signal, an output signal of the shift unit and an output signal of the correction unit as a feedback signal, and the channel estimation apparatus is used for estimating an entire channel frequency response and an optimal shift information from the frequency domain received signal according to the feedback signal, wherein the frequency domain received signal comprises a plurality of symbols and each of the symbols comprises a scattered pilot data and a transmission parameter; said channel estimation apparatus comprising:

a time domain axis channel estimation unit, for receiving the frequency domain received signal and performing the channel estimation in the time domain dimension so as to estimate an initial channel frequency response according to a channel information formed by the plurality of scattered pilot data;

a peak detection module, for detecting a peak position of the initial channel frequency response in the time domain and outputting the peak position to be used as a peak information;

a first shift unit, for adjusting a relative position of the initial channel frequency response in the time domain according to the optimal shift information so as to generate an adjusted initial channel frequency response;

a frequency domain axis channel estimation unit, for performing the channel estimation in the frequency domain dimension according to a numerical value of the adjusted initial channel frequency response so as to obtain the entire channel frequency response; and an optimal shift searching module, for generating a plurality of shift information according to the peak information and deciding the optimal shift information from the plurality of shift information by using the feedback signal and the entire channel frequency response.

2. The channel estimation apparatus with the optimal search of claim 1, wherein the peak detection module comprises:

an inverse fast fourier transform unit (IFFT unit), for converting the initial channel frequency response from the frequency domain into the time domain; and a peak detection unit, for detecting the peak position from the IFFT unit as the peak information.

3. The channel estimation apparatus with the optimal search of the claim 1, wherein the feedback signal is the output signal of the shift unit, said the optimal shift searching module comprises:
- a transmission parameter unit, for providing a plurality of mapping transmission parameters, wherein the plurality of mapping transmission parameters are respectively corresponding to the transmission parameters;
- an extract unit, for extracting the transmission parameters from the shift unit and extracting a plurality of subcarrier channel frequency responses with the transmission parameters from the entire channel frequency response;
- a calculation unit, for performing operations on the mapping transmission parameters, the transmission parameters extracted by the extract unit and the subcarrier channel frequency responses according to a maximum likelihood estimation approach (MLE approach) so as to output a decision information; and
- a decision unit, for generating the plurality of shift information according to the peak information and selecting one of the plurality of shift information as the optimal shift information according to the decision information.

4. The channel estimation apparatus with the optimal search of the claim 3, wherein the decision unit also generates a position information and the FFT unit decides an initial point according to the position information.

5. The channel estimation apparatus with the optimal search of the claim 1, wherein the feedback signal is the output signal of the correction unit, said the optimal shift searching module comprises:
- a transmission parameter unit, for providing a plurality of mapping transmission parameters, wherein the plurality of mapping transmission parameters are respectively corresponding to the transmission parameters;
- an extract unit, for extracting the transmission parameters from the correction unit and extracting a plurality of subcarrier channel frequency responses with the transmission parameters from the entire channel frequency response;
- a calculation unit, for performing operations on the mapping transmission parameters, the transmission parameters extracted by the extract unit and the numerical value of the subcarrier channel frequency responses according to an MLE approach so as to output a decision information; and
- a decision unit, for generating the plurality of shift information according to the peak information and selecting one of the plurality of shift information as the optimal information according to the decision information.

6. The channel estimation apparatus with the optimal search of the claim 5, wherein the decision unit also generates a position information and the FFT unit decides the initial point according to the position information.

7. The channel estimation apparatus with the optimal search of the claim 1, wherein the feedback signal is the frequency domain received signal, said the optimal shift searching module comprises:
- a transmission parameter unit, for providing a plurality of mapping transmission parameters, wherein the plurality of mapping transmission parameters are respectively corresponding to the transmission parameters;
- an extract and shift unit, for extracting the transmission parameters from the shift unit and extracting a plurality of subcarrier channel frequency responses with the transmission parameters from the entire channel frequency response;
- a calculation unit, for performing operations on the mapping transmission parameters, the transmission parameters extracted and adjusted by the extract and shift unit and the numerical value of the subcarrier channel frequency responses according to an MLE approach so as to output a decision information; and
- a decision unit, for generating the plurality of shift information according to the peak information and selecting one of the plurality of shift information as the optimal shift information according to the decision information;
- wherein the extract and shift unit adjusts the transmission parameters in the frequency domain received signal according to the plurality of shift information.

8. The channel estimation apparatus with the optimal search of the claim 7, wherein the decision unit also generates a position information and the FFT unit decides the initial point according to the position information.

9. The channel estimation apparatus with the optimal search of the claim 1, further comprising:
- a channel state estimation unit, for obtaining a channel state information according to the entire channel frequency response, wherein the signal processing module performs the operations for demodulating and decoding the output signal of the correction unit according to the channel state information.

10. The channel estimation apparatus with the optimal search of the claim 1, wherein the channel estimation apparatus with the optimal search is suitable for a coherent orthogonal frequency division multiplex system (coherent OFDM).

11. A channel estimation method with an optimal search, suitable for a demodulator comprising a fast fourier transform unit (FFT unit), a shift unit, a correction unit and a signal processing module, wherein the FFT unit generates a frequency domain received signal, the demodulator selects one of the frequency domain received signal, an output signal of the shift unit or an output signal of the correction unit as a feedback signal, and the channel estimation method is used for estimating an entire channel frequency response and an optimal shift information from the frequency domain received signal according to the feedback signal; said channel estimation method comprising the following steps:
- receiving the frequency domain received signal, wherein the frequency domain received signal comprises a plurality of symbols and each of the symbols comprises a scattered pilot data and a transmission parameter;
- performing the channel estimation in time domain according to a channel information produced by the plurality of scattered pilot data so as to generate an initial channel frequency response;
- detecting a peak position of the initial channel frequency response in the time domain so as to generate a peak information;
- deciding the optimal shift information according to the peak information and the feedback signal;
- adjusting a relative position of the initial channel frequency response in the time domain according to the optimal shift information so as to generate an adjusted initial channel frequency response; and
- performing the channel estimation in the frequency domain according to a numerical value of the adjusted initial channel frequency response so as to obtain the entire channel frequency response.

12. The channel estimation method with the optimal search of the claim 11, wherein the step for deciding the optimal shift information according to the peak information and the feedback signal comprises:

generating a plurality of shift information according to the peak information;

adjusting the relative positions of the initial channel frequency responses in the time domain sequentially according to each of the plurality of shift information and performing the channel estimation in the frequency domain to the numerical value of the initial channel frequency responses adjusted so as to obtain the entire channel frequency responses;

performing operations on the feedback signal and the information related to the transmission parameters in the entire channel frequency responses so as to generate a plurality of calculation results; and selecting one of the plurality of shift information as the optimal shift information according to the calculation results.

13. The channel estimation method with the optimal search of the claim 11, further comprising:

generating a position information at the same time as deciding the optimal shift information, wherein the FFT unit decides an initial point according to the position information.

14. The channel estimation method with the optimal search of the claim 11, further comprising:

obtaining a channel state information according to the entire channel frequency response and performing operations for demodulating and decoding the output signal of the correction unit.

15. The channel estimation method with the optimal search of the claim 11, wherein the channel estimation method with the optimal search is suitable for a coherent orthogonal frequency division multiplex system (coherent OFDM).

* * * * *